March 17, 1936.    A. BRUNNER    2,034,559
LOCKING CLIP
Filed Dec. 3, 1934
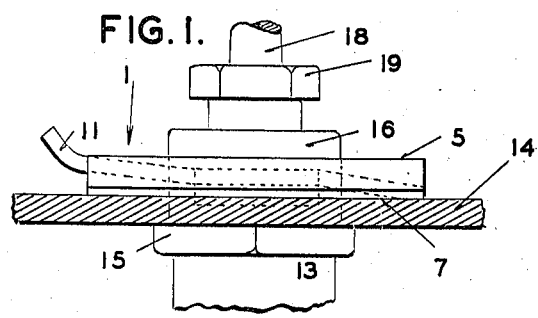
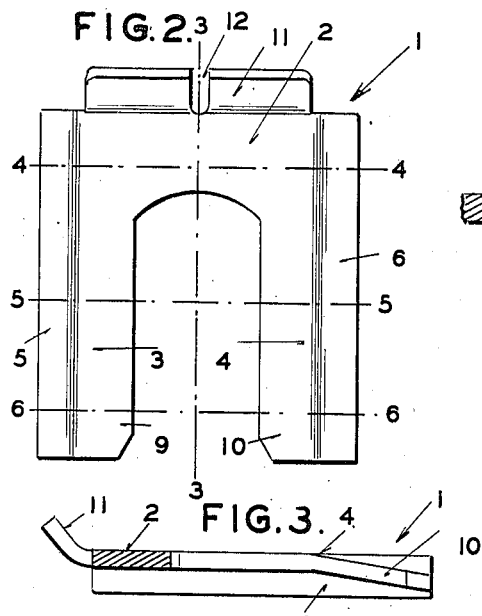
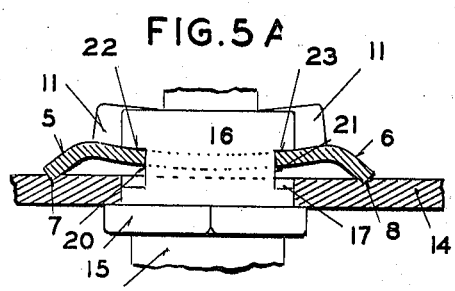
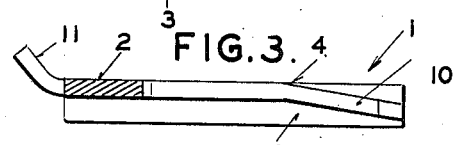
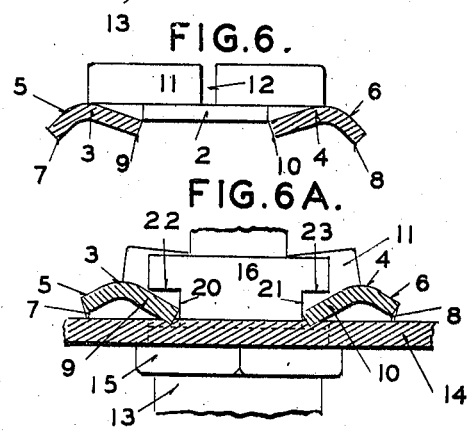
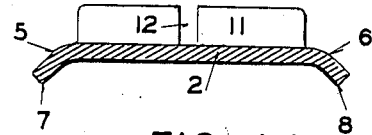
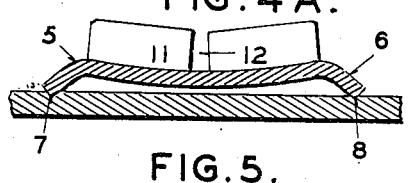
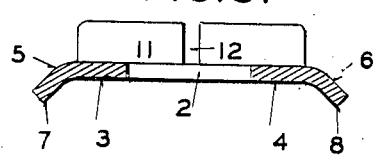
INVENTOR
ALBERT BRUNNER
BY
ATTORNEY Patented Mar. 17, 1936

2,034,559

UNITED STATES PATENT OFFICE 2,034,559

LOCKING CLIP

Albert Brunner, St. Louis, Mo., assignor to Wagner Electric Corporation, St. Louis, Mo., a corporation of Delaware Application December 3, 1934, Serial No. 755,668

6 Claims. (Cl. 85—5)

My invention relates to securing means and more particularly to a resilient clip for securing one member to another member.

One object of my invention is the production of a resilient clip which will secure one member to another and at the same time prevent relative movement between said members.

Another object of my invention is to produce a resilient clip of the U-shaped type which is so formed that it will be maintained in operative position by its inherent resiliency.

Still another object of my invention is to produce a U-shaped resilient clip which is so formed that when it is placed in operative position, it will be deformed to cause the outer parallel edges of the clip and the inner edges of the legs of the clip to become imbedded in the surface of one of the members which are to be secured together and thus prevent their relative rotation.

Further objects of my invention are to produce a securing clip which is easily and economically manufactured, highly efficient in operation, and readily assembled and disassembled from the cooperating members.

Other objects of my invention will become apparent from the following description taken in connection with the accompanying drawing disclosing one embodiment thereof. In the drawing Figure 1 is a side view showing my novel locking clip in operative position for securing a hose terminal member to a supporting plate; Figure 2 is a top view of the clip; Figure 3 is a cross sectional view taken on the line 3—3 of Figure 2; Figures 4, 5 and 6 are cross sectional views taken on the lines 4—4, 5—5 and 6—6, respectively of Figure 2; and Figures 4A, 5A and 6A are cross sectional views of the clip taken on the lines 4—4, 5—5 and 6—6, respectively, showing the locking clip in operative position.

Referring in detail to the drawing, my novel locking clip 1 is of U-shaped formation comprising a body portion 2 and a pair of parallel integral legs 3 and 4, lying in the same plane as the body portion. The outer marginal portions of the legs 3 and 4 and the adjacent marginal portions of the body are downturned, as indicated at 5 and 6 and since the locking clip is made from a single flat piece, the turning down of these marginal portions produces straight, sharp edges 7 and 8. The inner marginal portions of the legs 3 and 4 adjacent the outer ends of the legs are also downturned as indicated at 9 and 10. These portions 9 and 10 of the legs, however, are not turned down as abruptly or as far as the portions 5 and 6, as clearly shown in cross sectional view of Figure 6. The rear portion of the body of the clip is provided with a turned up flange 11 to form a tool engaging part for assisting in the removing of the clip from its operative position. This flange is provided with a slot 12 in order that the flange may not resist the downward bowing of the body portion 2, which bowing will take place when the clip is placed in its operative position and thereby maintain the clip in such position.

In Figure 1 I have shown my novel clip employed in securing a hose terminal member 13 to a supporting plate 14 but it is to be understood that such structure is for purposes of illustration only, since obviously the clip may be used for securing other members together, if desired. The hose terminal member is provided with a shoulder 15 and a cylindrical extension 16, which extension is adapted to project through an opening 17 in the supporting plate 14. Extension 16 has secured to it a tube 18, the securing means being shown as the usual standard nut 19. The extension 16 is also provided with a pair of slots 20 and 21 lying on opposite sides of the extension, these slots being so positioned that when the terminal member 13 is placed in the opening 17, the surfaces 22 and 23 of the slots will be a less distance from the supporting plate surface than the normal vertical distance between the top surface of the clip and the edges 7 and 8.

In the operation of my clip, terminal member 13 is inserted in the opening 17 of the plate and then the legs of the clip are inserted in the slots of the extension on the terminal member. As the clip is driven home the downturned edges 9 and 10 on the inner edges of the legs facilitate the insertion of the clip. The engagement of the inner edges of the legs with the upper surfaces 22 and 23 of the slots in the extension of the terminal member causes the clip to be bowed downwardly and the resiliency of the clip is such that the bowing thereof produces an axial pressure on the terminal member, thus resulting in the terminal member being clamped very tightly to the support 14 and also the imbedding of the straight, sharp edges 7 and 8 in the surface of the supporting plate. This imbedding or cutting in of the sharp edges is an important feature of my invention since the sharp edges, which are parallel with the line of direction in which the clip is driven, prevent any relative rotation between the terminal member and the supporting plate. If only a point contact were made between the clip and the plate, the relative rotation between the terminal member and the plate would be more easily permitted than where the engagement is a straight imbedded edge.

In order to further assist the edges 7 and 8 in preventing relative rotary movement between the terminal member and the plate, the inner downturned portions 9 and 10 of the legs will also be forced to engage and score the plate as a result of bowing of the clip when it assumes an operative position. This is clearly shown in Figure 6A. The forcing down of the inner portions 9 and 10 of the legs by the bowing of the clip also results in the extreme outer ends of the edges 7 and 8 being twisted slightly upwardly away from the supporting plate, as also shown in Figure 6A.

From the foregoing description of my invention, it is readily seen that I have produced a locking clip which is capable of being held in operative position by its own inherent resiliency and which so cooperates with the members that are being held together that there is little or no possibility of a relative rotary movement between them, since the clip when in operative position has four parallel, sharp edges imbedded in one of the members. It is also readily seen that my clip is very inexpensive to manufacture as all that is necessary is to take a flat, properly formed, U-shaped member and turn down the outer marginal portions of the legs and the adjacent marginal portions of the body of the member and the inner edges of the legs adjacent the leg ends.

Having fully described my invention, what I claim as new and desire to secure by Letters Patent of the United States is:

1. A resilient locking clip comprising a U-shaped member having the outer marginal portions of its legs down-turned and the inner marginal portions of its legs substantially flat, and lying in the same plane except those portions adjacent the ends of the legs, which portions are down-turned.

2. A substantially U-shaped resilient locking clip comprising a flat body member having a pair of integral flat legs lying in the same plane as the body member, the outer marginal portions of the legs and the adjacent marginal portions of the body member being down-turned and provided with straight sharp edges.

3. A substantially U-shaped resilient locking clip comprising a flat body member having a pair of integral flat legs lying in the same plane as the body member, the outer marginal portions of the legs and the adjacent marginal portions of the body member being down-turned and provided with straight sharp edges and the inner marginal portions of the legs adjacent the ends of the legs also being down-turned and provided with sharp edges.

4. A substantially U-shaped resilient locking clip comprising a flat body member having a pair of integral parallel legs, the outer marginal portions of the legs being down-turned and the inner marginal portions of the legs adjacent the leg ends also being down-turned, and said body member having an upturned flange at its rear edge, which flange is slotted at an intermediate point.

5. A U-shaped resilient locking clip comprising a body portion and a pair of integral legs, said legs being substantially flat except along their longitudinal marginal portions which portions are down-turned and provided with straight sharp edges.

6. In apparatus of the class described, a retaining clip of resilient material for association with a plate and a part to maintain them in fixed relation, said clip being provided with legs having down-turned elongated straight edges, the clip when in operative association with said plate and part having its legs in engagement with said part and having said edges embedded in the plate, the dimensions of the clip being such, relative to the position of the plate and part, that the clip is under deforming stress which maintains said edges in pressure contact with the plate.

ALBERT BRUNNER.